United States Patent [19]

Narayanaswami

[11] Patent Number: 5,568,616
[45] Date of Patent: Oct. 22, 1996

[54] SYSTEM AND METHOD FOR DYNAMIC SCHEDULING OF 3D GRAPHICS RENDERING USING VIRTUAL PACKET LENGTH REDUCTION

[75] Inventor: Chandrasekhar Narayanaswami, Austin, Tex.

[73] Assignee: International Business Machines Corporation, Armonk, N.Y.

[21] Appl. No.: 121,137

[22] Filed: Sep. 14, 1993

[51] Int. Cl.$^6$ .................................................. G06F 13/00
[52] U.S. Cl. ......................................................... 395/200.13
[58] Field of Search ....................... 364/DIG. 1 MS File, 364/DIG. 2 MS File; 395/200.01, 200.13, 200.15, 200.17

[56] References Cited

U.S. PATENT DOCUMENTS 4,853,956  8/1989  Astmann ................... 379/269

FOREIGN PATENT DOCUMENTS 0254047  1/1988  European Pat. Off. .

*Primary Examiner*—Robert B. Harrell
*Attorney, Agent, or Firm*—Mark S. Walker

[57] ABSTRACT

A system and method for virtually reducing interprocess communication packet size by dynamically redispatching packets for execution. A subcommand dispatching process dispatches individual subcommands and accumulates the resources used by each. The accumulated resource value is tested against a threshold. If the threshold is exceeded, the next subcommand position is recorded and control returned to the interprocess communication packet dispatcher for later dispatch. The virtual reduction of the packet size to conform to resource limits processor commitment to a single packet.

7 Claims, 4 Drawing Sheets

SYSTEM AND METHOD FOR DYNAMIC SCHEDULING OF 3D GRAPHICS RENDERING USING VIRTUAL PACKET LENGTH REDUCTION

BACKGROUND OF THE INVENTION

1. Field of the Invention

The present invention is directed to a system and method for rendering three-dimensional graphic images. More particularly, the present invention is directed to a client/server based graphics processing system with dynamic scheduling of server function.

2. Background and Related Art

High function graphics processing systems have traditionally been implemented using special purpose graphics adapter hardware. This special purpose hardware was optimized for graphics processing and integrated into the host computer systems so that the overall system efficiency was high.

The processing power of general purpose workstations, particularly those based on RISC technology has enable these workstations to be employed for increasingly complex graphics tasks. Interactive system performance has, however, become an issue in these systems. In particular, the rendering of complex three dimensional images may consume so much of the processor resource that the workstation ceases to respond to interactive user requests.

Workstation software is often implemented using a client/server model where an application is a client that requests services from a server. A graphics server manages a display device or display surface and controls the rendering and drawing to that surface. Division of process tasks into client and server function supports an environment where several applications (clients) can operate writing to a single display device divided, perhaps, into a plurality of windows. Server software is exemplified by The X Windows System from the Massachusetts Institute of Technology.

Client/Server environments rely on interprocess communication to send the service requests between the client and server process. The communication can be between two processes on a single computer system via shared memory or can be across a network. Communication efficiency is improved by transmitting large packets of information through the interprocess mechanism. Small packets reduce efficiency due to an inability to spread the interprocess communication overhead over sufficient message content.

Large communication packets received by the server result in large processing resources committed to processing that packet and to the reduced interactive response problems mentioned above. Existing systems typically schedule at the packet level so that once a packet begins processing nothing may interrupt that processing.

Thus, a technical problem exists to find a system and method for achieving interprocess communication efficiency without sacrificing interactive response time.

SUMMARY OF THE INVENTION

The present invention is directed to an improved interprocess communication packet processing system and method. The present invention employs virtual packet length reduction to implement dynamic scheduling. Virtual packet length reduction improves interactive response time by freeing the server processor from extended dedication to processing a single packet. Employment of a virtual packet length reduction allows the communicated packets to be large retaining the interprocess communication efficiencies.

The present invention is directed to a system for dynamically redispatching an interprocess communication packet having a plurality of processing subcommands. The system includes: means for dispatching individual subcommands for processing; means for accumulating an indicia of resources used by the dispatched subcommands; and means for testing the accumulated indicia and requesting redispatch of said communication packet if the accumulated indicia exceeds a threshold.

It is therefore an object of the present invention to provide a system and method for interprocess communication that achieves high communication efficiency without reducing interactive response.

It is yet another object of the present invention to allow virtual packet length reduction without impacting drawing order.

It is yet another object of the invention achieve dynamic scheduling of graphics rendering based upon the complexity of the graphics command being rendered.

The foregoing and other objects, features and advantages of the invention will be apparent from the following more particular description of a preferred embodiment of the invention, as illustrated in the accompanying drawing wherein like reference numbers represent like parts of the invention.

DETAILED DESCRIPTION

Figure 1:
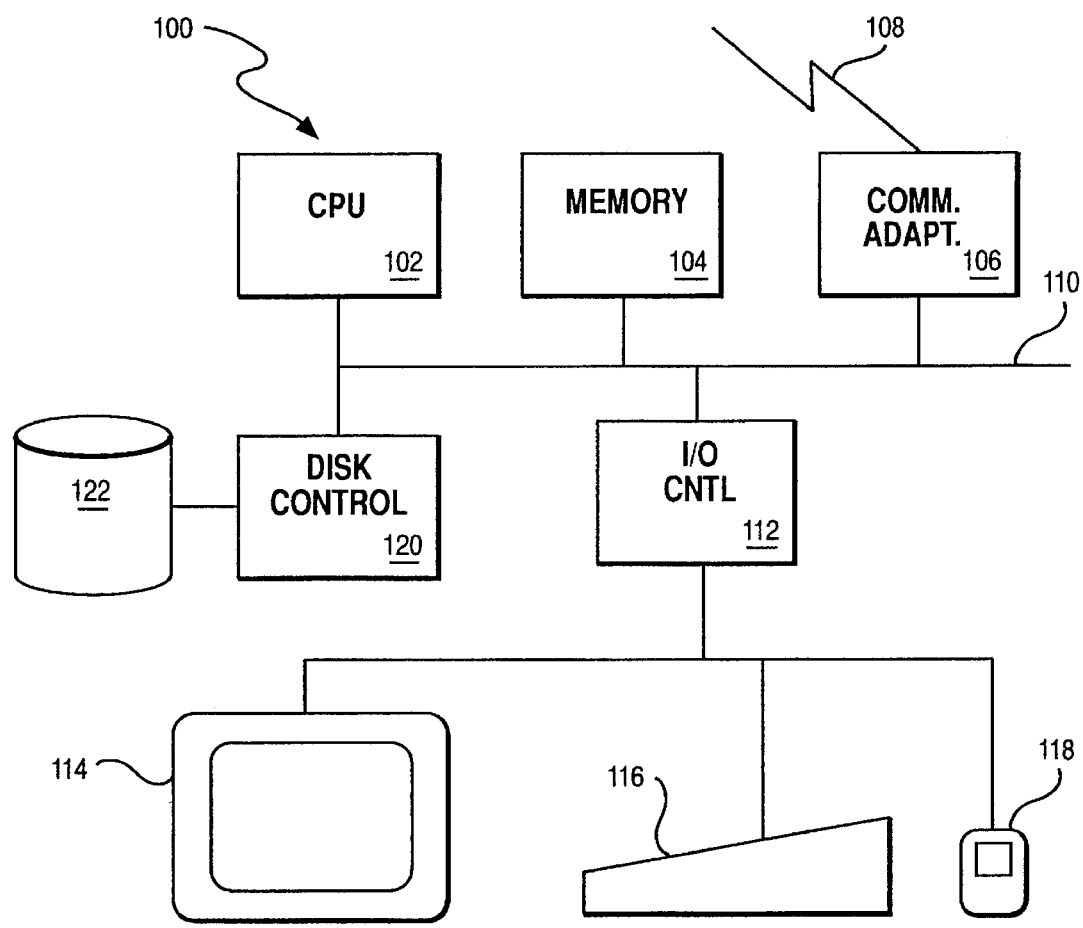
FIG. 1 is an illustration of a computer system on which the preferred embodiment of the present invention is implemented.

The present invention is implemented in a computer system such as that shown in FIG. 1. The computer system is preferably an IBM RISC System/6000 computer from the IBM Corp. (IBM and RISC System/6000 are trademarks of the IBM Corp.) though any similar workstation, personal computer or mainframe computer could be employed.

The computer system 100 has a processing unit 102, random access memory 104 and permanent storage 122. In addition, an optional communications adapter 106 enables communication with other computer systems. Input/Output controller 112 controls interaction with the video display 114, the keyboard 116 and pointing device 118. Disk controller 120 controls interaction between the processing unit and the permanent storage 122. The options represented here are typical components used in the preferred embodiment. Other components with similar function could replace those shown, for example, a removable diskette or an optical drive could be used in place of a magnetic drive for permanent storage 122 and the processor 102 could be comprised of a number of processing engines in a multiprocessor or parallel processing architecture.

Figure 2:
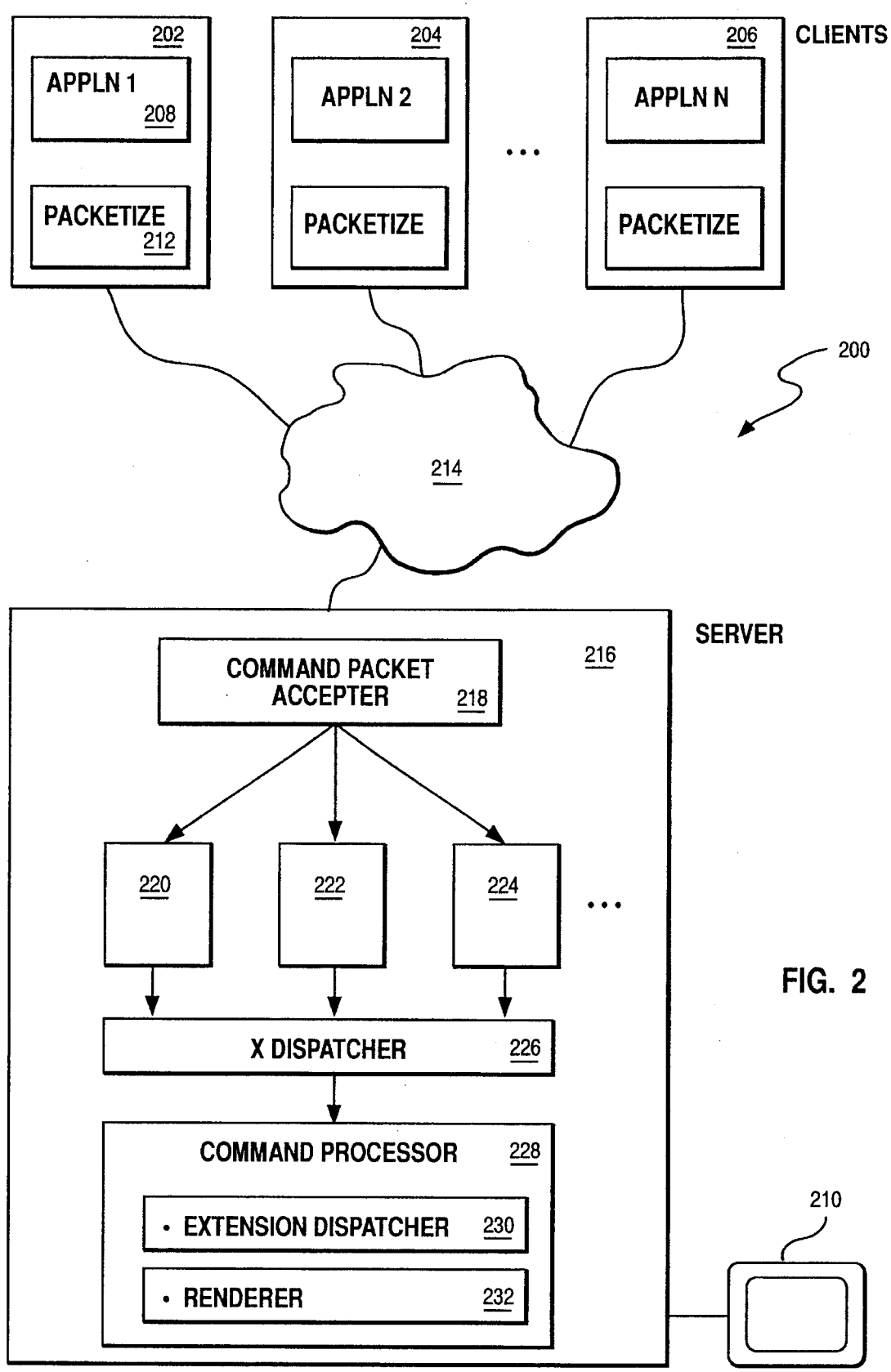
FIG. 2 is a block diagram of a client/server environment according to the preferred embodiment of the present invention.

A client/server environment is established in a computer system 100 through hardware and software parameters. FIG. 2 illustrates a client/server environment 200 for graphics processing. The present invention finds particular use for graphics processing but can be used in any client/server environment. Clients 202 204 206 each contain an application process, e.g. APPLN1 208. These processes are typically independent with each presenting graphical information in a single window of a display device 210. Three clients have been shown for illustrative purposes; the present invention is not limited, however, in the number of clients or servers implemented.

Interprocess data from client application APPLN1 208 is gathered into a communications packet by Packetizer 212. This packet is communicated to Server 216 through interprocess communications medium 214. As discussed above, interprocess communications medium 214 can be implemented as shared memory in a system in which clients and servers operate on the same computer system or can be implemented as a network where clients and servers operate on difference computer systems.

Server 216 receives command packets with Command Packet Accepter 218. Each command packet is stored in a command packet buffer 220 222 224. The number of command packet buffers is limited only by overall system memory capacity. The XDispatcher 226 accesses each command packet buffer and dispatches each command for execution by Command Processor 228. The XDispatcher illustrates one server dispatch technology; the present invention is not limited to use in X Windows Systems environments and can be used by any form of server dispatcher.

Command processor 228 performs the transformations necessary to render the graphics image and cause display of the graphics image in a display device 210. The display device can be a raster CRT, a laser printing device, a plotter or any similar display device.

The XDispatcher 226 attempts to "fairly" allocate resources to the commands from each application so that each is processed within a reasonable length of time. The typical dispatch algorithm dispatches a number of command packets, e.g. 4, from each application before returning to dispatch from the first application. This scheme assured that each application received an allotment of server processing time.

The above dispatch policy was adequate as long as each command packet processing elapsed time was relatively short. The use of a client/server system for complex graphics, such as 3D graphics, however, resulted in significantly larger packet sizes and reduced interactive system performance.

Figure 3:
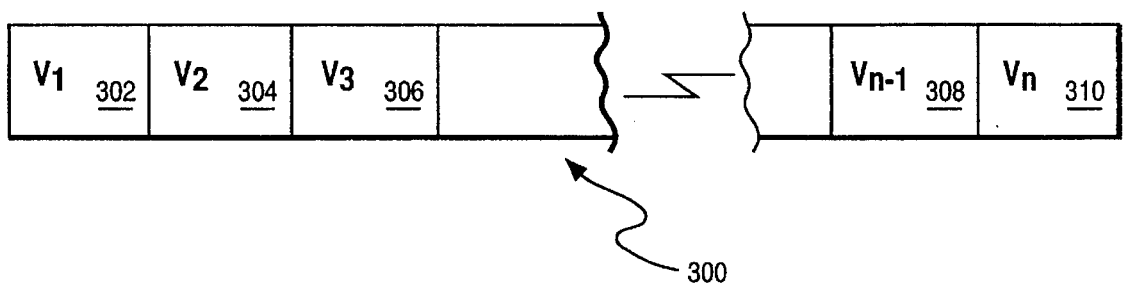
FIG. 3 is an illustration depicting a graphics command packet according to the present invention.

Complex graphics packets are large because they are comprised of a number of sub-commands each performing a specific function. For example, a command to draw a particular polygon will have subcommands for processing each vertex in that polygon. FIG. 3 illustrates a single graphics command packet 300 with subcommands $V_1$, $V_2$, . . . $V_n$ 302 304 306 308 310. Complex three dimensional images may have thousands of vertices that are to be processed within a single command. Processing these thousands of vertices may consume all available processor resource leading to unacceptable interactive performance.

Interactive performance can be increased by ensuring that each application has command packets processed within a "fair" amount of time. As discussed above, this may be accomplished by reducing the size of the packets, but this leads to interprocess communications inefficiencies. The preferred embodiment of the present invention provides a system and method for virtually reducing packet size using command redispatch.

The present invention introduces Extension Dispatcher 230 into the Command Processor 228. The Extension Dispatcher 230 controls dispatch of subcommands to the Rendering subsystem 232. The Extension Dispatcher reduces dispatching granularity to the subcommand level resulting in a virtually reduced packet size. The packet size virtually becomes a single subcommand size without compromising interprocess communication efficiency.

The Extension Dispatcher 230 operates by dispatching subcommands from one packet until a "fairness threshold" is reached. Once that threshold is reached, the current subcommand position is recorded and the entire command packet marked for future redispatching by the XDispatcher 226. The XDispatcher causes the other command packets to be processed until the first applications turn comes again. After redispatch, the Extension Dispatcher determines the starting subcommand position and begins dispatching from that point.

The "fairness threshold" can be set in various ways. The preferred embodiment employs a subcommand weighing scheme that assigns weights to each subcommand based on complexity of processing. Once the sum of the weighed commands exceeds the maximum allocated weight for a particular packet, control is relinquished. Selected commands can be designated as "simple" to be quickly processed without regard to weight (i.e. assigned a zero weight value), while other command sequences can be designated as non-surrenderable indicating control may not be relinquished until the entire series has been processed regardless of weighted values. The weight assignments can be adjusted for each particular system to ensure optimal graphics and interactive response.

An alternative method of controlling fairness is time-slicing. Each packet will receive a certain allocation of time after which the subcommand position will be recorded and the packet marked for redispatch by the XDispatcher 226.

Figure 4A:
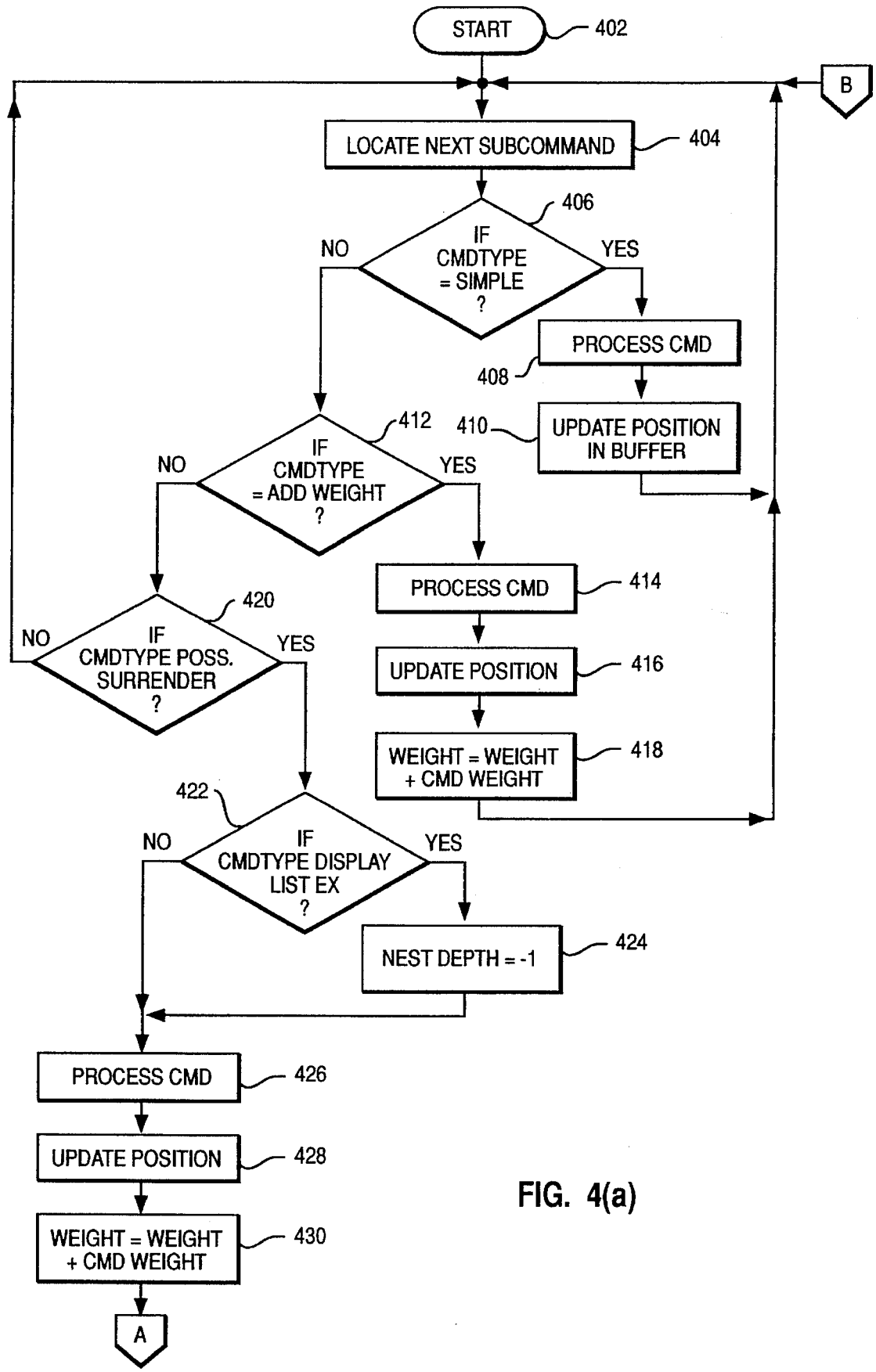
FIGS. 4(a) and 4(b) are flowcharts depicting the process steps according to the present invention.
Figure 4B:
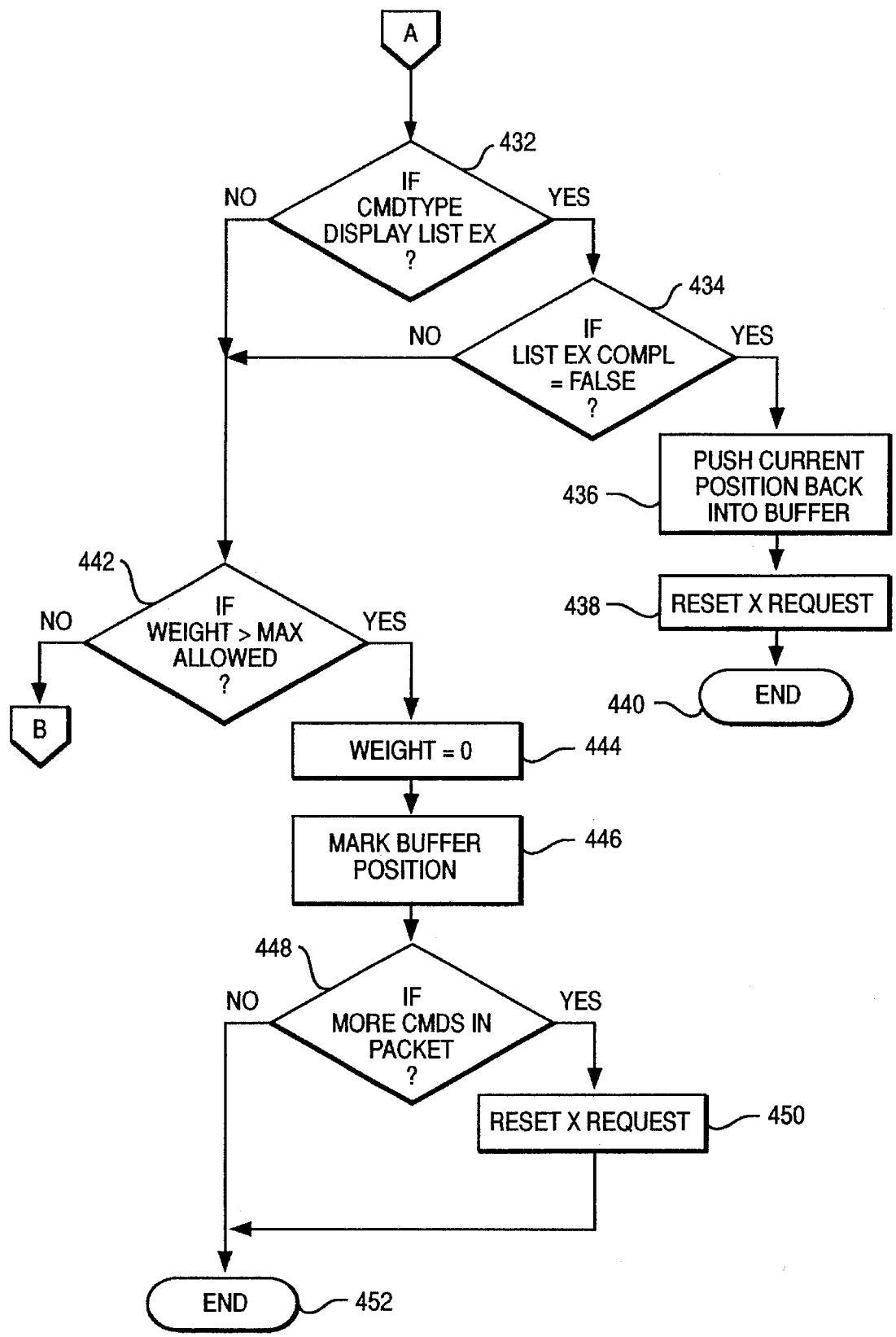

The process according to the preferred embodiment is illustrated in FIGS. 4(a) and 4(b). This process illustrates the weighted command approach. Implementation of a time slice approach requires replacement of weight accumulation and weight testing steps by time accumulation and time testing steps.

The inventive process comprises the Extension Dispatcher 230 and is implemented by a computer system such as that illustrated in FIG. 1. The process step sequence can be stored in permanent storage and then loaded into random access memory and executed by processor 102. The stored form of the process can be removable and transportable among many systems.

The process starts at step 402 and immediately proceeds to Locating the Next subcommand 404. The next subcommand is located with reference to a stored position buffer for that command packet buffer. If the dispatch is the first dispatch of that command packet buffer then the first subcommand is processed. Otherwise, the position buffer is referenced to determine the next subcommand to process.

The type of the subcommand is next tested 406. Each subcommand is assigned a type that will control processing and surrendering of control. The preferred embodiment assigns four command types: Simple, Add Weight, Possible Weight/Possible Surrender, and Display List Execution. The number of command types is not limited, however, and can be any arbitrary number based on the performance of a particular system.

If the command type is "Simple" that command is processed 408, the subcommand position buffer modified 410 and control returned to locate the next subcommand 404. The "Simple" command processing requires no weight determination and provides no opportunity for surrendering control.

If the command is not "Simple" it is next tested 412 to determine whether it is of type "Add Weight." If so, the command is processed 414, the subcommand position buffer modified 416 and the command weight added to the accumulated weight since the last surrender 418. Although weight is considered, the "Add Weight" command type does not test for or allow surrender of processing control. The process returns to locating the next subcommand 404.

If the command type is neither "Simple" nor "Add Weight" it is tested 420 to determine whether it is "Possible Weight/Possible Surrender". This command type allows consideration of command type weight and consideration of the surrender of control.

If the command type is "Possible Weight/Possible Surrender" the specific command is tested 422 to determine whether it is a "Display List Execute" type. A display list is a previously compiled group of commands that can be executed by invoking a single command. Since this single command will cause the processing of an indeterminate number of commands, the dispatcher must consider the weights and control issues of those invoked commands. If the command is a "Display List Execute" the nest level is decremented 424. In either case, the command is processed 426, the subcommand position updated 428, and the command weight accumulated 430.

The command type is again checked to determine if it is a "Display List Execute" type 432. If so, the current status is tested to determine whether the list execution at the current nesting level is complete. If so, the current command packet address is pushed back into the command position buffer 436, the XDispatcher is sent a ResetXRequest 438 to cause redispatch of the command packet, and control is returned to the Extension Dispatcher. Execution will resume at the next unprocessed subcommand when the command packet is redispatched.

If list execution has not completed, or if the command is not a Display List Execute type, the accumulated weight is tested against the maximum allowed weight for a command packet 442. If the accumulated weight exceeds the maximum, the accumulated weight is set to zero 444, the subcommand position marked 446, and, if subcommands remain in the packet 448, a ResetXRequest is sent 450 to the XDispatcher to cause redispatching at a later time. Control is then returned to the Extension Dispatcher 452.

The preferred embodiment has been expressed as a process preferable embodied in a computer implemented process. Special purpose hardware embodiments are also contemplated, however, and would not depart from the spirit of the invention.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

I claim:

1. A method for virtually reducing interprocess communication packet size in a client/server system having a server process receiving interprocess communication packets of a first size, the interprocess communication packets containing a sequential plurality of subcommands for processing by the server process, the server having a means for storing a plurality of interprocess communication packets for processing and a means for dispatching one of said interprocess communication packets for processing, the method comprising the steps of:

dispatching a next sequential one of said plurality of subcommands in said dispatched interprocess communication packet for processing;

accumulating an indicia of resources committed to said processing;

testing said accumulated indicia against a threshold; and repeating said dispatching, accumulating and testing steps for a next sequential command if said indicia is less than said threshold, or signalling said server to redispatch said dispatched interprocess communication packet and terminating processing of said dispatched interprocess communication packet if said indicia exceed the threshold.

2. A system for dynamically redispatching an interprocess communication packet having a plurality of processing subcommands, the system comprising:

means for dispatching individual subcommands for processing;

means for accumulating an indicia of resources used by said dispatched subcommands;

means for testing said accumulated indicia and requesting redispatch of said communication packet if said indicia exceeds a threshold.

3. The system of claim 2, wherein said indicia of resources is a weighted value assigned to each command type.

4. The system of claim 2, wherein said indicia of resources is elapsed time.

5. A computer program product having a computer readable medium having computer program logic recorded thereon for dynamically redispatching an interprocess communication packet having a plurality of processing subcommands, said computer program product comprising: means for dispatching individual subcommands for processing;

means for accumulating an indicia of resources used by said dispatched subcommands;

means for testing said accumulated indicia and requesting redispatch of said communication packet if said indicia exceeds a threshold.

6. A program product as in claim 5, wherein said indicia of resources is a weighted value assigned to each command type.

7. A program product as in claim 5, wherein said indicia of resources is elapsed time.

* * * * *